V. GRETTER.
Casing Spears.
No. 5,956. Reissued July 7, 1874.
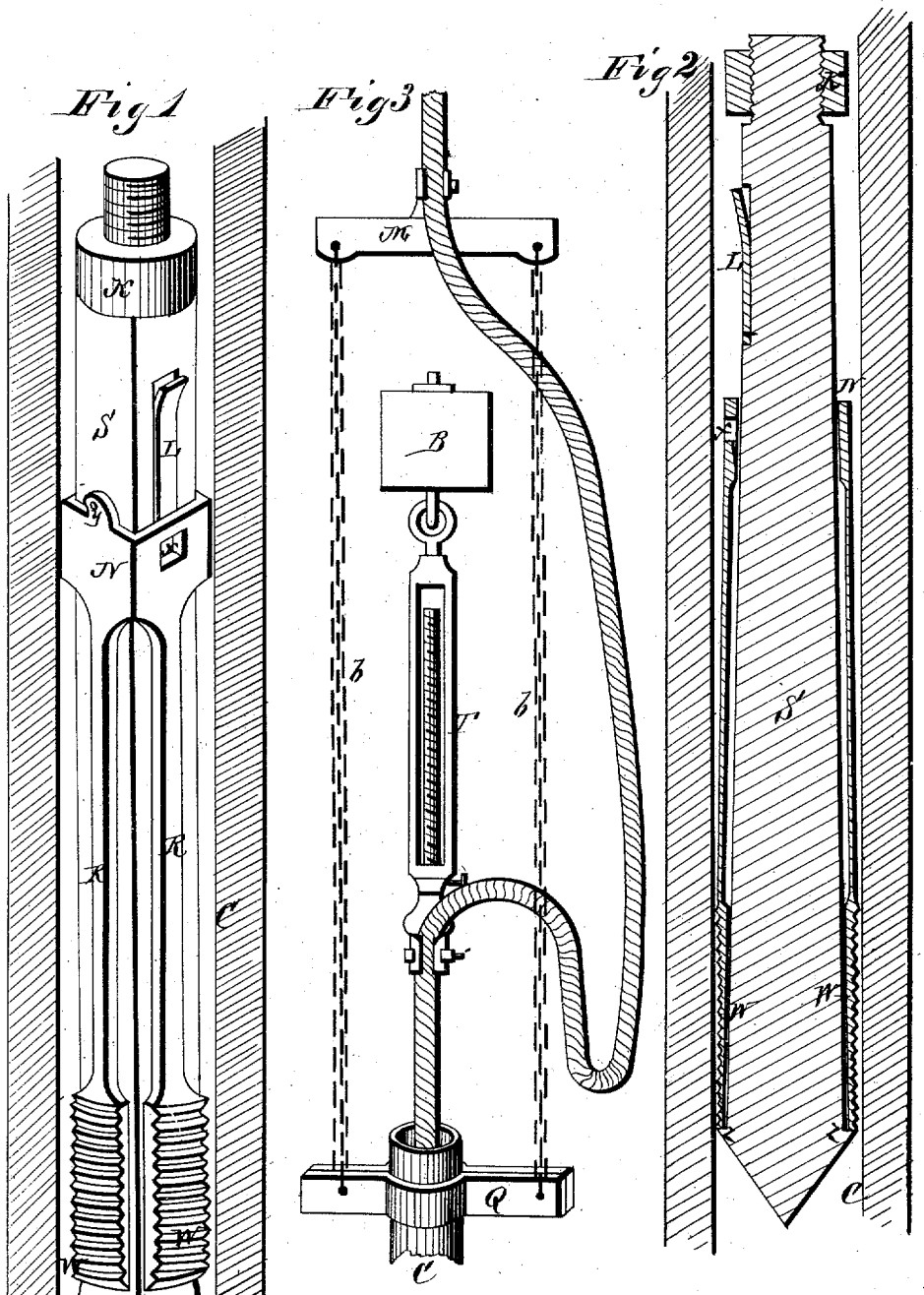
WITNESSES
F. L. Durand
C. L. Everett
INVENTOR
Victor Gretter,
per Alexander Thacher
Attorneys
THE GRAPHIC CO. PHOTO-LITH. 39 & 41 PARK PLACE, N.Y.

UNITED STATES PATENT OFFICE.

VICTOR GRETTER, OF RICHLAND TOWNSHIP, (ST. PETERSBURG P. O.,) CLARION COUNTY, PA.

IMPROVEMENT IN CASING-SPEARS.

Specification forming part of Letters Patent No. 143,141, dated September 23, 1873; reissue No. 5,956, dated July 7, 1874; application filed June 25, 1874.

*To all whom it may concern:*

Be it known that I, VICTOR GRETTER, of Richland township, Clarion county, Pennsylvania, (St. Petersburg P. O.,) have invented certain Improvements in Casing-Spears, of which the following is a specification:

The object of my invention is to loosen casing in oil-wells by jarring with ordinary drilling-"jars," with a hold within, near the bottom, (where the sticking always occurs,) thus obviating the necessity of cutting the same, which is the method of removal now employed. For this purpose a tool is necessary which can take a firm gripe at any point within, and at the same time one which can be loosened to allow withdrawal when the work is accomplished, and the casing hangs free from above; and also in a device for taking the weight of the casing from above while the jarring is done.

In the annexed drawing, S is a solid, square, tapering iron stem, with pin on top to fit ordinary drilling-tools, and conical guide at bottom, with shoulders Z Z to prevent the wickers from going too far down, which would burst the casing when it sticks too hard. The four wickers W W are secured by reins R R to a square collar, N, which works up and down on the stem S. One or more steel springs, L, are inserted in the stem, to catch in slots *x* in the inside of the square collar, so that on down-jarring the wickers can be caught up and supported by the springs L, and the tool withdrawn. The eye *y* on the square collar secures a line or wire with which to lift wickers in case of accident to the springs. The loose collar K is screwed on and off, so that the wickers may be removed when necessary.

Figure 3 shows the method of taking the weight of the casing C from above. The yoke M is secured by two chains, *b*, to clamps Q, at a sufficient width apart to allow jarring to be done by working the beam B, to which the temper-screw T is attached in the usual way to drilling-cable and drilling-tools.

Having thus fully described my invention, what I claim as new, and desire to secure by Letters Patent, is—

1. The combination, with the casing C and a wedging device operating within the same, of the yoke M, chains or ropes *b*, and clamp Q, all substantially as and for the purposes herein set forth.

2. The combination, with the tapering screw-stem S, wickers W, and straps R, of the shoulders Z, formed at the lower end of the stem, the square collar N, with eye *y*, one or more springs, L, and the movable collar K, all constructed substantially as and for the purposes herein set forth.

In testimony to the foregoing I her set my hand and seal this 12th day of 1874.

VICTOR GRETTER. [L. S.]

Witnesses:
ANSON TAYLOR,
O. J. DANIELS.